(12) United States Patent
Chen et al.

(10) Patent No.: US 6,351,956 B1
(45) Date of Patent: Mar. 5, 2002

(54) A/C CLUTCH SHORT ENGAGEMENT CONTROL METHOD AT ENGINE START WITHOUT LOCK-UP SENSOR

(75) Inventors: Gang Chen, Rochester Hills; James R Tamm, Ann Arbor; Dewane C Cogswell, Commerce, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/466,587

(22) Filed: Dec. 17, 1999

(51) Int. Cl.⁷ .......................... F25B 49/02; B60H 1/32
(52) U.S. Cl. .................. 62/133; 62/83; 62/208; 62/323.4
(58) Field of Search ................. 62/133, 323.1, 62/323.4, 230, 228.1, 228.4, 158, 83, 208, 209

(56) References Cited

U.S. PATENT DOCUMENTS

| | | | |
|---|---|---|---|
| 4,480,443 A | 11/1984 | Nishi et al. | 62/227 |
| 4,619,587 A | 10/1986 | Linnig | 417/319 |
| 4,862,700 A | 9/1989 | Suzuki | 62/115 |
| 4,939,909 A | 7/1990 | Tsuchiyama et al. | 62/158 |
| 5,018,362 A | 5/1991 | Nagase et al. | |
| 5,022,232 A | 6/1991 | Sakamoto et al. | |
| 5,027,611 A | 7/1991 | Doi et al. | |
| 5,056,326 A | 10/1991 | Ohkumo et al. | 62/133 |
| 5,257,507 A | 11/1993 | Taguchi | |
| 5,347,824 A | 9/1994 | Kato et al. | 62/133 |
| 5,415,004 A | 5/1995 | Iizuka | |
| 5,507,155 A | 4/1996 | Negishi | 62/228.4 |
| 5,617,730 A | 4/1997 | Suzuki | 62/133 |
| 5,653,119 A | 8/1997 | Kimura et al. | 62/228.5 |
| 5,761,917 A | 6/1998 | Corcoran et al. | 62/133 |
| 5,823,000 A | 10/1998 | Takai | 62/133 |
| 5,893,272 A | 4/1999 | Hanselmann et al. | 62/133 |
| 5,950,440 A | 9/1999 | Niimi et al. | 62/133 |

Primary Examiner—Harry B. Tanner
(74) Attorney, Agent, or Firm—Mark P. Calcaterra

(57) ABSTRACT

A compressor control system and method are provided for a vehicle air conditioner. The control device controls engagement of a compressor clutch member at engine start-up to discharge liquid refrigerant from the compressor. The control system provides for disengagement of the clutch member if the detected operating conditions are indicative of compressor lock-up without the use of a dedicated compressor lock-up sensor.

16 Claims, 3 Drawing Sheets

A/C CLUTCH SHORT ENGAGEMENT CONTROL METHOD AT ENGINE START WITHOUT LOCK-UP SENSOR

FIELD OF THE INVENTION

The present invention relates generally to a compressor control system for a vehicle air conditioner in order to discharge liquid refrigerant from the compressor, and more particularly to a method of disengaging the compressor clutch automatically during engine start to avoid any engine lock-up or engine damage.

BACKGROUND

When a vehicle is parked outdoors in the daytime for a considerable time, the passenger compartment is heated by the sun and the temperature becomes higher than the temperature in the engine compartment. If a vehicle is parked for a long time, the above-mentioned temperature difference occurs repeatedly each day, resulting in the refrigerant in the evaporator, which is disposed adjacent to the passenger's compartment, moving to the compressor which is disposed in the engine compartment at a portion lower than the evaporator and a condenser of the air conditioner system. The refrigerant in the compressor becomes liquid when the temperature falls. When the compressor is operated in this state, the compressor attempts to compress the incompressible liquid which generates an undesirable noise and shock both to the compressor and to the engine which ultimately drives the compressor.

Generally, the pumping torque for a compressor could be expressed as:

$$T_p = K_1 \rho V^2 + K_2 \Delta P$$

Where V is the fluid velocity which is proportional to the compressor's RPM. $\rho$ is the fluid density. P is the fluid pressure, and $K_1$ and $K_2$ are constants related to the geometrical and physical parameters of the pump. During engine starts after a long soak period, the second term, $K_2 \Delta P$ on the right side can be neglected for operating cases just prior to the build up of the pressure difference $\Delta P$. Since the density of liquid is usually at least 100 times greater than that of gas, depending on the pressure level, the torque needed by the compressor to pump the liquid refrigerant could be at least 100 times higher than that needed to pump the refrigerant in its gas phase. An air conditioning compressor and its drive system are primarily designed for gas phase operations of refrigerant. Therefore, an extremely high reaction torque generated by the compressor as it attempts to displace liquid refrigerant inevitably causes the drive belt to slip and squeal and also provides a shock to the system including the compressor and engine.

From the above equation, it shows that the reaction torque of this special operating condition can only be the same level as to pump the gas phase refrigerant if the compressor is engaged and operated at a speed which is ten times less than the normal operating speed.

It follows that the only opportunity for such low RPM compressor operation could be found during the engine start cranking. In order to provide a compressor control device which discharges the liquid refrigerant from the compressor without significant compression noise, a variable displacement compressor control device is proposed in U.S. Pat. No. 5,617,730 in which a variable displacement compressor is controlled to be engaged at engine start so that the compressor is driven at a limited volume and within a limited number of revolutions of the engine. In so doing, the compressor is purged of the liquid without liquid-compression-noise.

However, in case the compressor is mechanically locked-up, the engine could either not be started or be damaged during the engine start with this device. Some car companies with this device use a lock-up sensor to detect if the compressor is locked-up. If the sensor detects the compressor is locked-up, the engine control device will disengage the compressor. This obviously increases the production cost with an additional sensor.

SUMMARY OF THE INVENTION

In view of the above-described circumstances, it is a primary object of the present invention to provide a compressor clutch control device, which disengages the compressor clutch without a dedicated lock-up sensor. Furthermore, this new invention is specifically designed for a fixed displacement compressor with a new control scheme.

Another object of the present invention is to provide a compressor control device that disengages the clutch when the battery voltage drops below a certain limit. When the compressor is locked-up, the starter motor may not rotate or may rotate very slowly with belt slip. When this happens, a high current is drawn from the battery and the battery voltage dramatically drops. Therefore, this control device also maximizes the potential for reliable engine starting when the battery has a low state of charge.

A further object of the present invention is to provide a compressor control device that disengages the clutch when the engine speed is below a certain point after a certain period of time since the engine started cranking. When the compressor is locked-up, the engine may not rotate or may rotate very slowly with belt slip. When this happens, the readings from the engine speed sensor will be low. During normal engine cranking, engine speed gradually increases. The compressor is supposed to be engaged soon after the engine starts to rotate. If, after a predetermined time period, the engine speed has not reached a predetermined speed, the compressor is disengaged.

A still further object of the present invention is to provide a compressor control device that disengages the clutch when the timer reaches a certain point since the compressor is engaged at engine start. During a normal situation, the compressor will be disengaged within a number of limited revolutions. When the compressor is locked-up, the engine cannot rotate or rotates slowly. Therefore, the limit of the revolutions may never be reached. If this lasts too long, the battery or engine assembly could be damaged. This is another way to ensure that the clutch does not stay engaged if the compressor is locked up.

These and other objects of the present invention are obtained by providing a compressor control system for a vehicle air conditioner, comprising a compressor having an input shaft which is selectively driven by a crankshaft of an engine by a clutch member. A control device is provided for controlling engagement of the clutch member at engine start-up to discharge liquid refrigerant from the compressor regardless of a previous operating condition of the vehicle air conditioner. The control device engages the clutch member during engine start-up when the engine coolant temperature is below a predetermined high level, the ambient temperature is above a predetermined low temperature limit and the battery voltage is above a predetermined level. After the clutch member has been engaged, the control device disengages the clutch if a battery voltage drops a predetermined value. The control device also disengages the clutch after clutch engagement if the engine speed exceeds a predetermined high level or falls below a predetermined low level.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
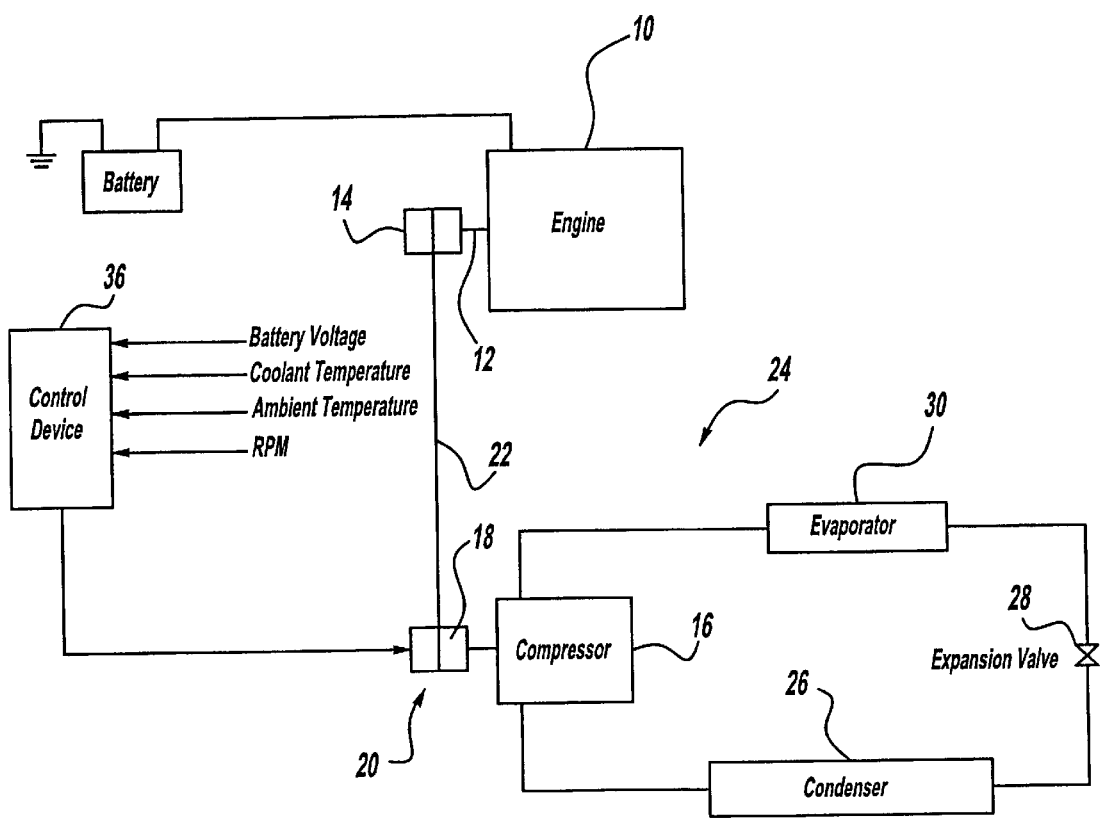
FIG. 1 is a block diagram of a compressor control device according to the principals of the present invention.

In the engine driven compressor control device according to the present invention as described with reference to FIG. 1. The system includes an engine 10 which has a crankshaft 12 connected to a pulley 14. A compressor 16 is provided with a clutch member 18 which engages a pulley 20 to the compressor 16. The pulley 14 which is connected to the crankshaft 12 of the engine 10 is connected to the pulley 20 by a belt 22.

The compressor 16 is part of refrigeration circulating system 24 which includes a condenser 26 for cooling and condensing the high temperature refrigerant sent from the compressor 16, an expansion valve 28 for decompressing the refrigerant, and an evaporator 30 for evaporating the refrigerant. A blower motor (not shown) is provided for blowing air into the passenger compartment through the evaporator 30.

The compressor 16 is driven by the engine 10 through the belt 22 and clutch member 18.

Figure 2:
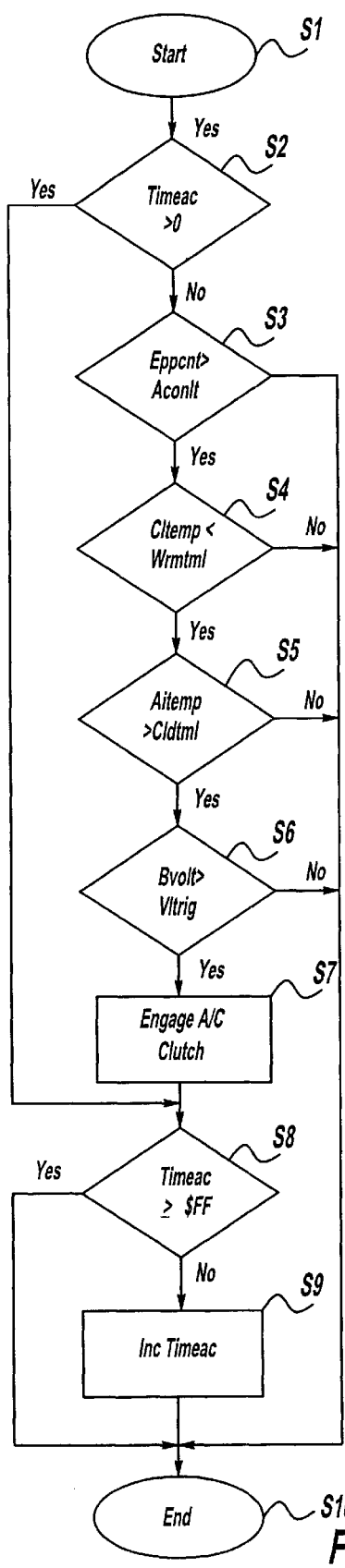
FIG. 2 is a flowchart showing the process executed by a control unit for determining engagement of an air conditioning clutch according to the principles of the present invention.

A control device 36 is provided for controlling engagement of the clutch member 18. The control device 36 controls engagement and disengagement of the clutch member 18 during engine start-up according to the flowcharts shown in FIGS. 2 and 3. With reference to FIG. 2, the control scheme for determining engagement of the clutch member 18 is started at step S1. At step S2, the control device 36 determines if the time value Timeac is greater than 0. Timeac is the time since clutch engagement. When Timeac is greater than zero, it means the a/c clutch has been engaged. If not, flow continues to step S3 where it is determined if the Eppent value exceeds the Aconlt value. Here, Eppent is the engine position pulse count. One engine revolution equals two Epp for a four-cylinder engine. Aconlt is the a/c compressor clutch "ON" trigger, which means the a/c compressor clutch is supposed to be engaged after the start of engine rotation is detected. The Aconlt trigger is used to engage the compressor at a low engine speed. The Aconlt trigger avoids the compressor being started at the same time as the engine does. This is because the starter motor draws high current from the battery before the crankshaft starts to rotate. To guarantee a reliable engine start, it is necessary to engage the compressor after the peak power demand from the battery. If at step S3 the Eppent value exceeds the Aconlt value, the flow continues to step S4 where it is determined whether the engine temperature exceed a predetermined hot temperature limit. This hot temperature limit is to prevent compressor engagement during engine hot restarting. When the engine is already warmed-up, the amount of liquid refrigerant remaining in the compressor is generally small and the compressor control according to the present invention is not necessary. If the time from the previous engine start is short, the liquid accumulation in the compressor can be neglected after a short interval of previous a/c clutch short engagement. The high compressor temperature due to the hot engine body also will evaporate the liquid refrigerant in the compressor. As an example, a temperature on the order of about ten degrees higher than the highest possible ambient temperature is selected for the value Warmtml. If the engine coolant temperature limit is not exceeded at step S4, the flow continues to step S5 where it is determined if the ambient temperature (Aitemp) exceeds a predetermined low temperature limit (Cldtml). The predetermined low temperature limit is provided to prevent compressor engagement when the ambient temperature is below the freezing point. The compressor 16 is not driven in order to prevent the evaporator 30 from frosting.

If it is determined that the ambient temperature (Aitemp) is greater than the cold temperature limit (Cldtml), the control device 36 determines, at step S6, if the battery voltage (Bvolt) is greater than a battery voltage trigger value (Vltrig) in order to prevent clutch engagement if the battery voltage is below a predetermined value. If the battery voltage (Bvolt) is greater than the voltage trigger value (Vltrig), the flowchart continues to step S7 where the control device 36 sends a signal to engage the clutch 18.

If at step S3 the value of engine position pulse Eppent is determined not to be greater than the value Aconlt (the engine crankshaft has not been rotated a predetermined amount), then the control scheme of the present invention is not enabled and the flow diagram proceeds to the end at step S10. Likewise, if the engine temperature exceeds the hot temperature limit (Step S4) or the ambient temperature is below the cold temperature limit (Step S5), or if the battery voltage is below the voltage trigger value (Step S6), the control scheme of the present invention is disabled and the flow proceeds to the end at step S10. After the clutch is engaged, however, at step S7, the flow proceeds to step S8 where it is determined whether the time since clutch engagement (Timeac) is greater than or equal to a predetermined value. The predetermined value represented by FF is a time limit value. If yes, the flow proceeds to the end at step S10. If not, the time value Timeac is incremented at step S9.

Figure 3:
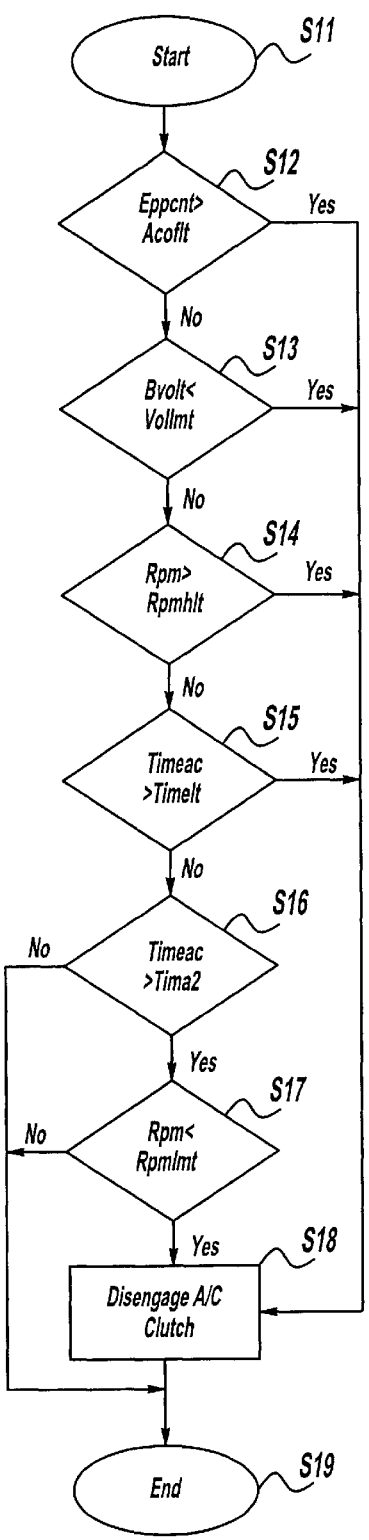
FIG. 3 is a flowchart showing the process executed by the control unit for determining disengagement of the air conditioning clutch according to the principles of the present invention.

After the clutch has been engaged, the control device 36 then proceeds to determine when to disengage the air conditioning clutch. The control scheme carried out by the control device 36 is shown in FIG. 3. At step S11, the control scheme starts and proceeds to step S12 where it is determined if the engine position pulse Eppent is greater than a predetermined number of revolutions or pulse counts (Acoft). If yes, the flow proceeds to step S18 where the air conditioning clutch is disengaged. If at step S12, the value Eppent is not greater than the value Acoft, the flow proceeds to step S13 where it is determined if the battery voltage (Bvolt) is below a predetermined limit (Vollmt). If the battery voltage is below the voltage limit, the flow proceeds to step S18 where the air conditioning clutch is disengaged. This would be indicative of a compressor lock-up condition where a high current draw from the battery occurs if the compressor and starter motor cannot rotate or rotates very slowly with a high resistance. If at step S13 it is determined that the battery voltage is not lower than the low voltage limit, the control scheme proceeds to step S14 where it is determined if the engine RPM exceeds a high limit (Rpmhlt). This is to avoid excessive start noise if the engine speed jumps too fast during some abnormal starts. For example, the RPM high limit could be set to be approximately 2000 RPM which would indicate too high of a speed for the compressor to operate without undesirable noise and shock if liquid refrigerant is present. Thus, if the RPM exceeds the high limit, the control scheme proceeds to step S18 where the air conditioning clutch is disengaged. If the RPM high limit is not exceeded, at step S14, the control scheme proceeds to step S15 where it is determined if the time value Timeac is greater than a predetermined time limit value (Timelt). For example, the time limit value (Timelt) is approximately two seconds. If the time limit value is exceeded at step S15, then the control scheme proceeds to step S18 and the air conditioning clutch is disengaged. If the time limit value is not exceeded at step S15, the control scheme proceeds to step S16 where it is determined if the time value Timeac exceeds a second time limit value (Tima2). If not, the flow proceeds to the end at step S19 and the control scheme is started again at step S11. If the Timeac value does exceed the Tima2 value, the control scheme proceeds to step S17 where it is determined if the engine RPM is below a predetermined lower limit (Rpmlmt). Rpmlmt is set to disengage the clutch when the engine speed is zero or below a certain number due to compressor lock up. However, Tima2 is set to avoid the clutch being disengaged right after engagement. Under normal conditions without a lock-up, the engine rpm after a time period of Tima2 should be much higher than Rpmlmt. For example, the predetermined lower limit (Rpmlmt) is approximately 50 RPM. If the RPM value is below the lower limit after a time period of Time, the control scheme proceeds to step S18 where the air conditioning clutch is disengaged. If the engine RPM is not below the lower limit as determined at step S17, then the control scheme proceeds to the end at step S19 and the control scheme is carried out again starting at step S11.

The above-described control scheme for controlling engagement/disengagement of the compressor clutch member 18 is carried out regardless of the previous operating condition of the air conditioner prior to the vehicle being turned off during the most prior use. Furthermore, the present invention provides a compressor clutch control system which disengages the compressor clutch without a dedicated lock-up sensor. The control scheme is especially designed for a fixed displacement compressor as opposed to a variable displacement compressor as is required by the systems of the known prior art. The control device disengages the clutch 18 when the battery voltage drops to a certain limit indicative of when the compressor 16 is locked-up or when the starter motor cannot rotate. The compressor control device 36 of the present invention also disengages the clutch 18 when the engine speed is below a certain point.

When the compressor 16 is locked-up, the engine 10 cannot rotate or rotates at a very low speed with belt slip. Thus, when this happens, the readings from the engine speed sensor will close to zero. During a normal engine cranking, the engine speed is increased to a cranking speed, and then the engine should be started up soon after cranking.

The control system also provides for disengagement of the compressor clutch 18 when the timer reaches a certain point. During a normal situation, the compressor 16 will be disengaged within a number of limited revolutions. When the compressor is locked-up, the engine 10 cannot rotate or rotates slowly. Therefore, the limit of the revolutions could never be reached. If this lasts too long, the battery or engine could be damaged. Therefore, the time limit imposed for disengaging the clutch 18 will help to ensure that the engagement of the clutch 18 during compressor lock-up does not exceed a predetermined time limit.

Figure 4:
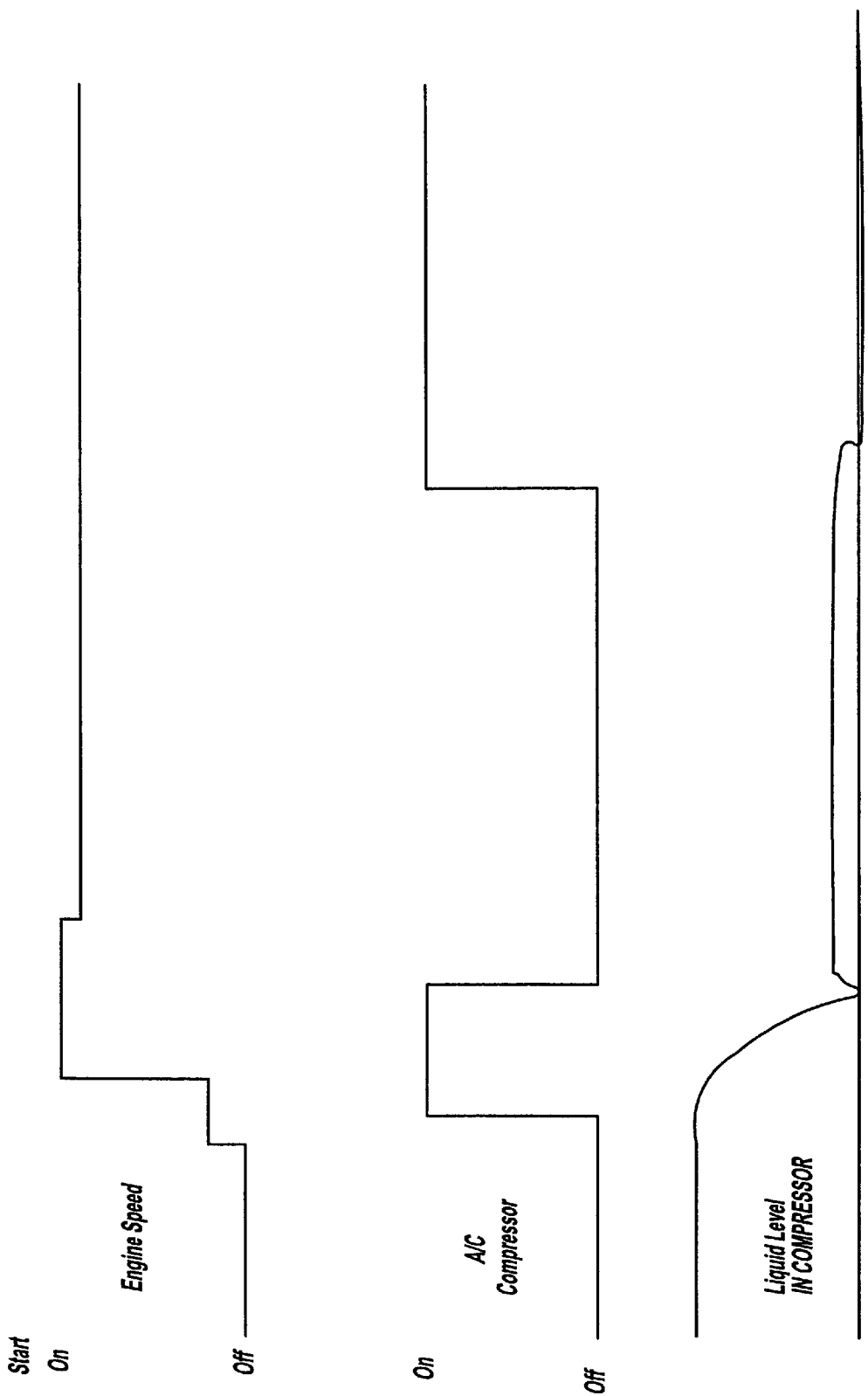
FIG. 4 is a timing chart showing the engine speed, air conditioning compressor engagement and liquid level in the compressor during engine start-up for discharging liquid refrigerant from the compressor according to the principles of the present invention.

With reference to FIG. 4, the engine speed is shown on a timing chart for illustrating the engagement of the air conditioning compressor during engine start-up and the corresponding reduction in the liquid level in the compressor during engine start-up.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A compressor control system for a vehicle air conditioner, comprising:
    an engine having a crankshaft;
    a compressor having an input shaft selectively drivably connected to said crankshaft of said engine by a clutch member;
    a control device for controlling engagement of said clutch member at engine start-up to discharge liquid refrigerant from said compressor regardless of a previous operating condition of said vehicle air conditioner.

2. The compressor control system according to claim 1, wherein said control device determines whether an engine coolant temperature is below a predetermined high temperature limit, whether an ambient temperature is above a predetermined low temperature limit and whether a battery voltage is above a predetermined level prior to engaging said clutch member at vehicle start up.

3. The compressor control system according to claim 1, wherein said control device disengages said clutch member if a battery voltage is below a predetermined value.

4. The compressor control system according to claim 1, wherein said control device disengages said clutch member if the engine speed exceeds a predetermined high level.

5. The compressor control system according to claim 1, wherein said control device disengages said clutch member if the engine speed is below a predetermined low level after a certain period of time.

6. The compressor control system according to claim 1, wherein said control device controls engagement of said clutch member after a predetermined amount of rotation of said crankshaft.

7. The compressor control system according to claim 1, wherein said compressor is a fixed displacement compressor.

8. The compressor control system according to claim 1, wherein said control device disengages said clutch member if an amount of time since clutch engagement exceeds a predetermined time.

9. A compressor control system for a vehicle air conditioner, comprising:

an engine having a crankshaft;

a compressor having an input shaft selectively drivably connected to said crankshaft of said engine by a clutch member;

a control device for controlling engagement of said clutch member at engine start-up to discharge liquid refrigerant from said compressor regardless of a previous operating condition of said vehicle air conditioner, said control device determines whether an engine coolant temperature is below a predetermined high temperature limit, whether an ambient temperature is above a predetermined low temperature limit and whether a battery voltage is above a predetermined level prior to engaging said clutch member at vehicle start up, said control device disengages said clutch if a battery voltage is below a predetermined value, the engine speed exceeds a predetermined high level or the engine speed is below a predetermined low level after a certain period of time.

10. The compressor control system according to claim 9, wherein said control device controls engagement of said clutch member after a predetermined amount of rotation of said crankshaft.

11. The compressor control system according to claim 9, wherein said compressor is a fixed displacement compressor.

12. A method of controlling engagement of a compressor of a vehicle air conditioning system at vehicle start-up, comprising the steps of:

determining if an engine coolant temperature exceeds a predetermined high value;

determining if an ambient temperature is below a predetermined low value;

determining if a battery voltage is above a predetermined value; and engaging said compressor if said engine coolant temperature is below said predetermined high value, said ambient temperature is above said predetermined low value and said battery voltage is above said predetermined voltage level regardless of a previous operating condition of said air conditioning system.

13. The method according to claim 12, wherein after said compressor is engaged, further comprising the steps of:

disengaging said compressor if an engine speed exceeds a predetermined high level; and disengaging said compressor if an engine speed is below a predetermined low level after a certain period of time.

14. The method according to claim 13, wherein after said compressor is engaged, further comprising the step of disengaging said compressor after said compressor has been engaged for a predetermined time period.

15. The method according to claim 11, further comprising the step of disengaging said compressor if a battery voltage is below a predetermined level.

16. The method according to claim 11, further comprising the step of disengaging said compressor if an engine speed is below a predetermined value after said compressor has been engaged for a predetermined time period.

* * * * *